United States Patent [19]

Giusti

[11] 4,354,788

[45] Oct. 19, 1982

[54] AUTOMATIC SYSTEM FOR THE FORMATION AND DISTRIBUTION OF LAYERS OF GROUPS OF SHEETS

[76] Inventor: Giampiero Giusti, 42 Via S. Marco, 55100 Lucca, Italy

[21] Appl. No.: 119,179

[22] Filed: Feb. 6, 1980

[30] Foreign Application Priority Data

Feb. 21, 1979 [IT] Italy .............................. 17702 A/79

[51] Int. Cl.[3] ............................................ B65G 57/08

[52] U.S. Cl. ...................................... 414/55; 198/404; 198/425; 198/577; 198/784; 414/28; 414/763; 414/766

[58] Field of Search ........................ 414/28, 35, 36, 55, 414/56, 758, 761, 762, 763, 764, 765, 766, 767; 198/425, 404, 575, 577, 784; 271/229, 245

[56] References Cited

U.S. PATENT DOCUMENTS

| | | | |
|---|---|---|---|
| 1,967,638 | 7/1934 | Von Reis | 198/784 X |
| 2,865,516 | 12/1958 | Hedderich | 414/766 X |
| 2,984,364 | 5/1961 | Lamb | 414/766 X |
| 3,184,079 | 5/1965 | Buccicone | 414/766 X |
| 3,254,778 | 6/1966 | Marland et al. | 198/784 X |
| 3,447,696 | 6/1969 | Calistrat | 414/55 X |
| 3,529,711 | 9/1970 | Mueller | 198/425 X |
| 3,717,075 | 2/1973 | Lopez | 414/36 X |
| 3,770,144 | 11/1973 | DiFrank et al. | 414/55 X |

*Primary Examiner*—Leslie J. Paperner

*Attorney, Agent, or Firm*—Cushman, Darby & Cushman

[57] ABSTRACT

A machine for the distribution of sheets comprises first and second conveyors, the first conveyor receiving groups of sheets and being drivable in directions toward or away from the second conveyor and the second conveyor being drivable in a direction away from the first conveyor, a control system for driving the second conveyor only when a group of sheets reaches it from the first conveyor and to stop the second conveyor when the group of sheets has passed over the second conveyor, a vertically movable stop member located above the second conveyor between a lowered position for stopping a group of sheets so as to form them into a layer and a raised position, the stop member being also movable along the second conveyor, the control system controlling the vertical movement of the stop member and movement of the first conveyor to move sheets away from the second conveyor when a layer of sheets has been formed on the latter.

7 Claims, 3 Drawing Figures

AUTOMATIC SYSTEM FOR THE FORMATION AND DISTRIBUTION OF LAYERS OF GROUPS OF SHEETS

This invention relates to an automatic system for the formation and distribution of layers of sheets of any kind of material, preferably such as paper, cardboard, corrugated board, plastic and the like.

More particularly, in the field of corrugated board production, specific requirements must be met between the exit end of the corrugating machine or corrugator (from which groups of sheets of corrugated board, i.e. groups of sheets of a certain size, one on top of the other, are ejected continuously and automatically) and the stacking machine (i.e. the device in which said groups of sheets of corrugated board are stacked); in the case of large sized material, stacking is performed by placing each group of sheets over the other, while in the case of smaller sizes stacking requires a previous preparation of layers, each of which is formed by a certain number of groups placed side by side at the same level, and in this case stacking is done by placing each one of such layers over the other.

The above mentioned requirements are as indicated below:

(1) the layer must be formed by a programmable number of groups of sheets;

(2) the layer must be formed by groups of sheets placed closely side by side;

(3) the layer must be well squared and aligned;

(4) the layer, when necessary, must be formed by groups of sheets tipped over by 180° and it must be possible to program the sequence of such 180° tipping in all its various possible combinations (such 180° tipping phase may be necessary as the sheets of corrugated board leaving the corrugating machine tend to buckle due to the differentiated shrinking of the paper elements with which they are formed);

(5) the sheets must not undergo wrinkling during the tipping over phase.

So far, in order to meet the above requirements, simple belt conveyors are employed around which several people operate manually and with difficulty, thus causing the formation of imperfections and, particularly, greatly reducing production rhythms, i.e. slowing down in speed of the automatic corrugating machines, placed upstream in the production line, which, per se, are actually capable of operating at much higher speed levels.

The 180° tipping phase is particularly quite troublesome especially in the case of groups of sheets of larger sizes, in which case, even the very quality of said layer sheets may be jeopardized.

Even in those cases in which the count of the number of groups of sheets which will form each single layer is done mechanically, time taken by this operation adds up to the time required to perform the other manual operations in the production cycle, such as the picking up, the forming and tipping over of said layers, further adding up to a still greater reduction of overall production rhythms.

It is therefore the object of this invention to avoid the aforesaid drawbacks by providing a system which allows to perform all the operations in the cycle automatically, to obtain a perfect forming of the layers and increase production rhythm to a great extent thus bringing it up to level with the maximum operative speeds of the automatic machines upstream in the production line.

With the system described in this invention only a single operator is required, and merely for controlling purposes; all other necessary operations, such as counting of the groups of sheets in compliance with the previously programmed number of groups of sheets which must form each layer, formation of the latter through said groups of sheets, the accurate placing of the groups of sheets side by side in each single layer, the correct squaring and aligning of each single layer, plus the possible aforesaid 180° tipping phase, all take place in a completely automatic sequence. Furthermore, overlapping of the phases relative to the formation of the layers and to the determination, for each layer, of a number of groups of sheets equal to the one programmed, which added to the large reduction of time taken by the other various phases with reference to manual systems, all clearly result in a considerable decrease in the time required for the overall production cycle.

The operator will step in (only when necessary) simply to place a so-called usual "connection sheet" over a layer (the purpose of this "connection sheet" is to improve binding of the groups of sheets in the layer) in order to compensate for a possible difference in height between one group of sheets and the other by transferring other sheets between them.

It is obvious that the invention is not applicable to the field of corrugated board and in the formation of layers to be automatically stacked, alone, but may be employed in any field where the necessity exists of forming layers of groups of sheets of any type which need to be subsequently stacked (either automatically or not) or which do not need to be stacked and which may or may not require to be tipped over by 180°.

The complete apparatus according to this invention is substantially characterized in that it comprises a preparatory group, formed by two horizontal planes, placed one after the other longitudinally with respect to the apparatus itself and at the same level, each of which comprises motor driven means, such as horizontal rollers, placed transversally with respect to the apparatus, conveyor belts or the like, the motor driven means of the first one of said planes being capable of rotating in both directions so as to cause the groups of sheets which reach said first plane from a sheet group forming or sheet group production machine placed upstream in the line, to approach or move away with respect to the second plane, while the motor driven means of said second plane can be made to rotate only in the direction which moves the groups of sheets away from the first plane and from which said groups of sheets are sent to the second plane, conventional electric sensor automatic control means or the like being provided in order to cause movement of the motor driven means of the second plane only when a group of sheets is reaching it and to stop said motor driven means when the group of sheets has passed completely over the second plane, said preparatory group also comprising a stopping member, vertically movable over said second plane between a lowered position which stops incoming groups of sheets on said second plane in order to form said layer, and a raised position which allows downstream forwarding of the formed layer with respect to said second plane, said stopping member also, being apt to slide along fixed guides of the second plane, being apt to be blocked at a distance from the zone separating the first and second plane, such to allow feeding to said second plane of the number of groups of sheets, desired and programmed each time, for the layer to be formed, said automatic control means also controlling, in a programmed manner, the vertical movement of said stopping member as well as starting the motor driven means of the first plane in a direction which moves the group of sheets away from the second plane as soon as the programmed formation of the layer of groups of sheets on it, is terminated. The entire apparatus according to the invention may also comprise a tipping unit placed downstream with respect to said preparatory unit, and consisting in two parallel and opposing planes, each of which includes motor driven means, such as horizontal rollers placed transversally with respect to the system, conveyor belts or the like, said two planes of the tipping unit being mounted on a main frame which has its fulcrum in its two ends so as to allow rotation of 180° of said two planes and in such a position that one of these planes situates at the same level with the two planes of the said preparatory unit, the tipping unit planes also being movable with respect to each other in order to clamp a layer of groups of sheets between them, same automatic means being provided, as well, for control in a programmed manner of the beginning of rotation in both directions, and stopping, of the motor driven means of the planes of the tipping unit, stopping of the motor driven means of the second plane of the preparation unit, stopping and beginning of forward rotation of the motor driven means of the first plane of the preparatory unit reciprocal movement (back and forth) of the two planes of the tipping unit as well as its rotation, the tipping unit being capable of feeding each layer of groups of sheets from the preparatory unit to a stacking machine placed downstream with respect to the tipping unit in any sequence of passage whatsoever of layers with or without tipping, said sequence being presettable through conventional programming means.

These and other characteristics of the invention will be further illustrated with the aid of the following detailed description of an exemplified, and not limiting, form of embodiment of the invention itself with reference to the enclosed drawings in which.

Figure 1:
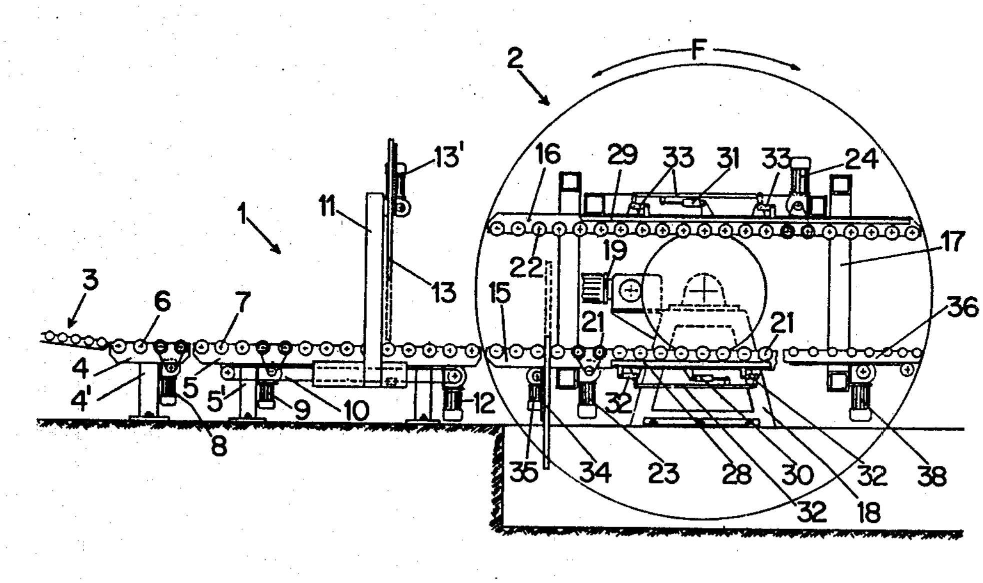
FIG. 1 is a schematic side elevation representation, with parts in section, of the system.

With reference to the drawings, the system according to the invention substantially comprises a preparatory unit and a tipping unit, identified generally at 1 and 2 respectively. These two units are to be intended as being placed between the exit of the corrugating machine (not shown), placed on the left of drawings 1 and 3, and the stacking machine (not shown), placed on the right of drawings 1 and 3); an inclined plane 3, formed by a series of free running horizontal rollers, is placed between said corrugating machine's exit and said preparatory unit 1. The preparatory unit 1 is formed by two horizontal planes 4 and 5) supported at the same level by fixed columns 4' and 5' respectively, and each of said horizontal planes comprises a certain number of rollers 6 and 7 respectively, which are caused to rotate through an appropriate form of transmission (represented schematically, and only partially) through gearmotors, 8 and 9 respectively, with self-braking motors so as to aid (plane 4) in the stopping action of "exceeding" groups of sheets (as will be further explained later), and to allow close contact between the group of sheets on plane 5 (as will also be explained more in detail later). Rollers 6 of plane 4 may be activated in both directions of rotation, while rollers 7 of plane 5 may be activated only in the direction of rotation which causes the groups of sheets to advance (as will be described more in detail later) from left to right with respect to drawings 1 and 3.

A support 11, which is actuated by a gearmotor 12 through a sprocket and chain transmission, is made to slide longitudinally along guides 10 fastened to plane 5.

Figure 3:
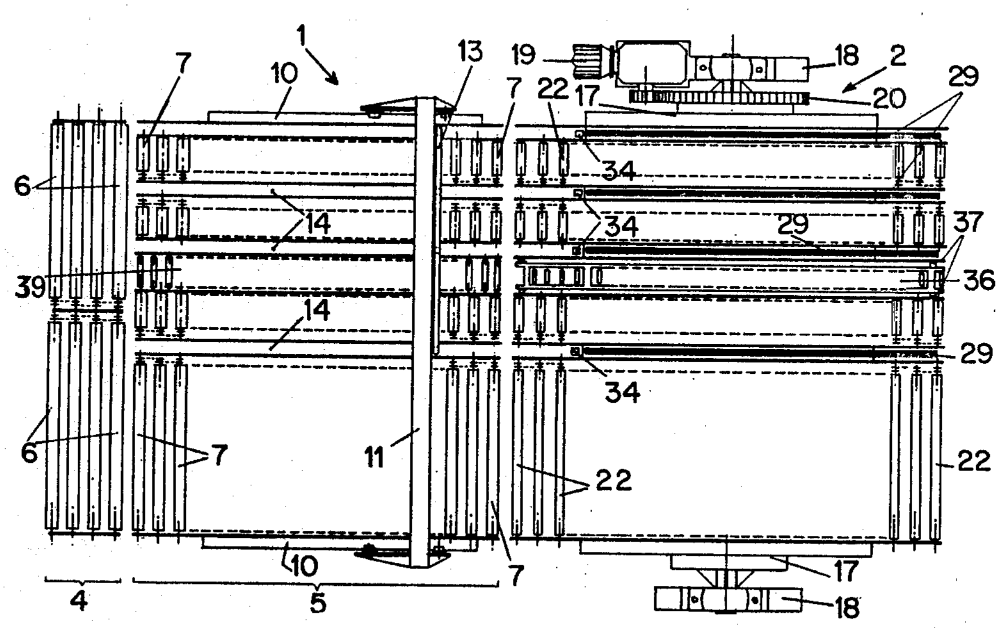
FIG. 3 is a schematic plan representation, partially broken away and with minor detail changes, of the system according to FIG. 1.

A plate shaped stopping member 13, carried by said support 11 is movable vertically along appropriate guides, by means of a gearmotor 13' through a rack and pinion transmission. Rollers 7 of plane 5 are shown, in the form of the embodiment of FIG. 3, as being subdivided vertically along FIG. 3 itself in order to leave spacer 14' empty in the event that stopper 13 should be formed, instead of by a continuous plate by a fork shaped member the points of which, as the stopper itself is lowered, would fit into said spacer 14; it is also to be noted that stopper 13, as can be seen in FIG. 3, extends for only part of the transversal breadth of plane 5, this amount of extension being sufficient for the function which stopper 13 is to carry out (as will be seen later) over the groups of sheets. Tipping unit 2 is, in turn, formed by two parallel and opposed planes 15 and 16, supported by a main frame 17, which has its fulcrum on columns 18 at its ends, in order to be able to rotate 180° around its own horizontal axis in accordance with the two senses of direction of arrow F in FIG. 1.

The whole unit 2 is made to rotate by means of a gearmotor 19 through a rack and pinion transmission 20. Planes 15 and 16 each have a certain number of rollers 21 and 22 respectively, which may be caused to rotate, in both directions, by means of gearmotors 23 and 24 respectively, along with an appropriate transmission (represented schematically and only partially).

Figure 2:
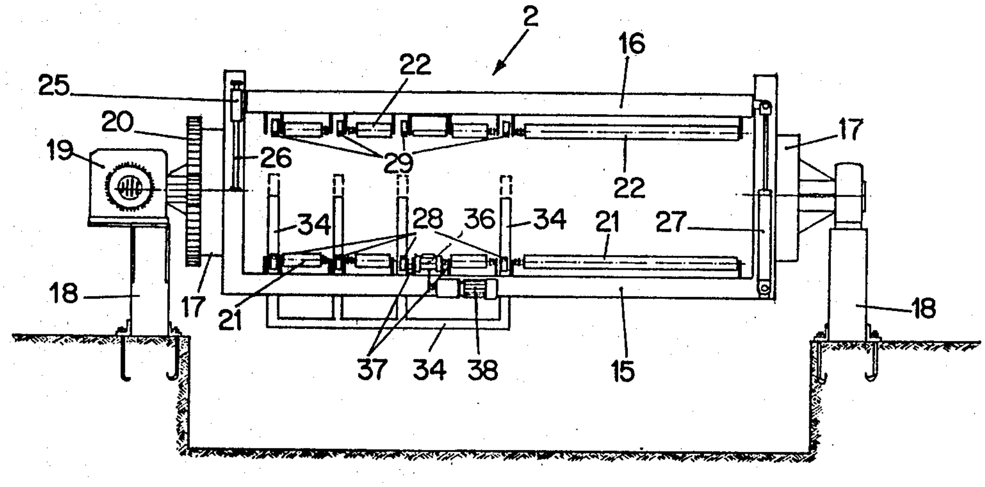
FIG. 2 is a schematic side elevation representation, with parts in section and minor detail changes of the right hand assembly of FIG. 1 according to a view in a plane perpendicular to the plane of FIG. 1.

Plane 16 carries, practically at its ends, four sleeves 25 with spheres (of which only one is visible in FIG. 2) which are apt to slide along four vertical rods 26, fixed to frame 17, so that plane 16 may move towards and away with respect to plane 15. The sliding movement is imparted by two pistons 27, hinge coupled on frame 17, along the center line of plane 16.

Two rubber or similar material strips 28 and 29 are placed between the rows of rollers of planes 15 and 16, said strips may be lowered or raised by means of pistons 30 and 31 and respective articulated rod transmissions 32 and 33.

Plane 15 is further provided with a fork shaped stopping or holding member 34, which through gearmotor 35 provided with a rack and pinion transmission, may be raised and lowered, its teeth sliding in the empty spaces between the rollers of planes 15 and 16 (see FIG. 3 in particular), the rollers being subdivided in the section in which said stopping member 34 extends, specifically to this end.

In plane 15 a small sliding movable supplementary plane 36 is also provided, at the same level with plane 15 itself and is apt to slide along guides 37 (fixed to plane 15), by means of a gearmotor 38 coupled to a chain and sprocket transmission, a small plane of such type may be provided for the plane 16 also.

Operation of the system in accordance with the invention will now be described. The system itself must be programmed in order to be able to follow two different work cycles in function of the size of the sheets forming said group of sheets: it will be possible to have, in the case of large sizes, an automatic working cycle A which involves use of said small movable plane 36, and in the case of smaller sizes an automatic working cycle B which excludes use of said small movable plane.

Program setting of automatic operating cycle A

At the beginning of the cycle conditions are as follows:

(a) planes 15 and 16 of tipping unit 2 are considered tipped by 180° with respect to their position shown in the drawings, so that plane 15, comprising the small movable plane 36, is in the upper position and plane 16 in the lower position; the cycle may also begin with planes 15 and 16 in the position shown in the drawings;

(b) movable plane 36 is retracted towards the inner part of plane 15 (position shown in FIGS. 1 and 3);

(c) rubber strips 28 and 29 are moved back, i.e. they are in the position shown in FIG. 1;

(d) plane 16, without movable plane 36, is placed, as previously stated, in its lowered position and is aligned with plane 5 of preparatory unit 1;

(e) stopping member 34 of plane 15 is in its extracted position, i.e. it is lowered between plane 15 and plane 16 and corresponds with the right hand end of the system;

(f) in the cycle example which will be described it is assumed that the programming device (not shown) is in the position which imposes stacking of the groups of sheets so as to lay these one over the other alternately one layer of groups of sheets tipped by 180° and the next incoming layer, in the same direction in which they arrive from the corrugating machine;

(g) stopping member 13 is lowered to the level of plane 5;

(h) stopper 13 is fastened in the longitudinal direction of plane 5, in such a position that, on the surface of plane 5 limited between the left hand end of plane 5 itself and stopping member 13, a number of groups of sheets equal to that which was programmed to form a layer, is received exactly;

(i) the roller section formed by rollers 6 of plane 4 is rotating in its feeding direction towards plane 5, while all other motors are stopped;

(j) all the devices (not shown) which signal the presence of the groups of sheets are inactive.

As stated in point (h) above, the number of side by side groups of sheets which will form a layer is programmed by simply actuating the motor controlling translation of stopping member 13 along guides 10 so as to cause it to move in the desired direction till a meter-counter reads the distance which is desired from the left hand end of plane 5, such distance being equal to the sum of the extensions of the number of groups of sheets with which it is desired to form the layer.

The above mentioned programmer contains the program which will be described, as well as all the variables deriving from the position which the groups of sheets are to assume in the stack which will be formed (one straight layer and one tipped layer alternately, or two straight layers and two tipped layers alternately or one straight layer and three tipped layers or one periodic straight layer etc. . . . ).

Operation of automatic working cycle A

The groups of sheets of corrugated board leave the exit of the corrugating machine in groups and slide along slanted plane 3 and reach plane 4 the rollers of which, as previously stated, being in rotation translate the groups of sheets towards plane 5. As soon as the first group of sheets reaches the area which separates plane 4 from plane 5, it presses an electric limiting switch (not shown) which imparts rotation to rollers 7 of plane 5 and keeps them rolling as long as it stays pressed. At this point several situations may occur, in function of the number of groups of sheets (one or more) of which said group of groups of sheets is formed. More precisely: (a) the number of groups of sheets is less than that required to form the programmed layer. In this case the whole group of groups of sheets passes over plan 5 till it disengages the above mentioned limiting switch which then stops rollers 7; arrival of a new group of groups of sheets is then awaited. As soon as a new group arrives from the corrugating machine, said limiting switch is pressed again (in this way the front end of the new group of groups of sheets is close to the back end of the previous group) and thus rollers 7 begin to rotate again and keep rotating till plane 5 is reached by the programmed number of groups of sheets necessary to form the layer. As soon as the front part (or head) of the layer reaches stopping member 13, it presses an electric sensor (not shown) which stops rollers 6 and excites a timer (not shown). Once the time programmed through the timer has elapsed, the latter stops rollers 7 (this time interval is required in order to allow for the groups of sheets of a layer to be placed close together correctly) and at the same time controls raising of stopping member 13 which stops in its raised position in order to allow successive passage of the groups of sheets. In this position, through a limiting switch (not shown) rollers 7 are caused to rotate again thus translating the layer towards plane 16 of the tipping unit and at the same time also rollers 6 of plane 4 rotate but in an opposite direction in order to slightly move the groups of sheets possibly present on plane 4 backwards, so as to disengage the last group of sheets, which is on the left hand end of plane 5, from the one which is on the right hand end of plane 4 (otherwise it could happen that the group of sheets of plane 5 drags the group of sheets of plane 4 towards the right along with it, as the latter may have got stuck in some way to the other).

(b) The number of groups of sheets exceeds the number required to form the programmed layer. In this case before the whole group of groups of sheets has entered plane 5, the group of sheets first in line reaches stopping member 13 and presses the above mentioned limiting switch thus, starting the cycle (already illustrated) which involves correct reciprocal side-by-side positioning of the groups of sheets, raising of stopper member 13 and separating the layer of groups of sheets of plane 5 from the groups of sheets remaining on plane 4.

(c) If, at the beginning of the cycle, groups of sheets remaining from the preceding group of groups of sheets are present on plane 4, the automatism behaves as in the case of situation (a).

Having the possible forseeable situations been cleared in the description of the logics of the automatic working cycle in the preparation phase of a layer, it should be noted that, when necessary, the operator may insert, over the groups of sheets, the previously described "connecting sheets" in order to bind the layer more effectively, or also, if necessary, may correct errors in height between one group of sheets and the other by transferring sheets of corrugated board from one group of sheets to the other.

Resuming the description from the point in which rollers 7 have been caused to rotate in order to feed the layer towards plane 16, and rollers 6 for separation of the groups of sheets remaining in a group (which is a mandatory phase which must take place in any one of the situations (a), (b), (c), once a certain programmed amount of time has elapsed stopping of rollers 6 takes place and, as soon as the layer advancing on plane 5 appears at the interstice between plane 5 and plane 16, it engages another electric sensor (not shown) placed in the interstice itself, which imparts rotation to rollers 22 of plane 16 so as to allow advancing of the layer. As soon as the layer has completely transferred to plane 16, the electric sensor stops rollers 7 and at the same time activates rollers 6 in order to allow formation of a new layer.

As soon as the layer on plane 16 reaches member 34, it engages an electric sensor (not shown) which controls stopping of rollers 22 and at the same time controls raising of plane 16 (through the above mentioned members 25, 26 and 27) which will stop when it has brought the layer of groups of sheets in contact with upper plane 15. At this point rotation by 180° in a clockwise direction of tipping unit 2 takes place, and pistons 30, 31 by means of their related articulated rod systems 32, 33 cause rubber strips 28, 29 to be respectively raised and lowered, in order to block the layer between them, the rubber compensating possible differences in height of the individual groups of sheets so as to prevent sliding of the sheets during the tipping operation.

The function carried out by stopping member 34 during the tipping operation itself is quite clear (i.e. to prevent layer from falling or leaving from the space between planes 15 and 16). Once the 180° tipping has terminated, stopping member 34 is lowered, plane 16 is raised again and rubber strips 28, 29 are brought back to their inoperative position shown in FIG. 1. Rollers 21 of plane 15 are now activated and at the same time the small movable plane 36 is slid along its guides 37 causing plane 36 to protrude to the right; the layer of groups of sheets is then translated towards the stacking machine as it is supported by said small movable plane 36, (such supporting function is required, as previously stated, since in the case in consideration the groups of sheets are of large size and in a transversal direction with respect to the system and therefore without the use of said small movable supporting plane, they would bend under their own weight and could not be translated correctly to the stacking machine). When the layer has completely passed over the stacking machine, it engages an electric limiting switch (not shown), which controls the return of the small movable plane 36. As soon as the next layer is ready on plane 5, stopping member 13 is raised again and the cycle is repeated in the above mentioned manner with the only difference that the layer is now translated towards plane 15 (not towards plane 16 as in the previous case) since the tipping unit, as it has been seen, has been tipped 180°. When the layer has completely passed over plane 15 rollers 21 begin to rotate again and small movable plane 36 moves as well in order to translate the layer of groups of sheets to the stacking machine, where it will be placed over the preceding layer; the two layers considered so far will therefore appear to be placed as follows: the first layer will be tipped by 180° and the second layer will be straight; finally, return of the small movable plane takes place and at the same time rollers 21 are stopped.

With the small movable plane back in place the tipping group is rotated 180° in a counterclockwise direction, and is empty, in other words containing no layers of groups of sheets; after this the system is preset to repeat the described cycle over again.

It is obvious that the cycle could take place by stacking the first layer straight and the second layer tipped 180°, just as well.

Presetting of automatic working cycle B (a) The tipping group may be in the position shown in FIG. 1 as well as in the 180° tipped position;

(b) small movable plane 36 is withdrawn in plane 15 and will never be used;

(c) rubber strips 28, 29 are in their inactive position (as shown in FIG. 1);

(d) stopping member 34, if plane 15 is raised, is pulled downwards, or, if member 15 is lowered, stopping member 34 must be in its withdrawn position beneath the level of rollers 21;

(e) the programmer, in the example which will be described, is preset so as to improve stacking of the groups of sheets as in cycle A (i.e. one layer of groups of sheets tipped 180° and the next laid straight);

(f) stopping member 13 is lowered so as to stop the layer of groups of sheets;

(g) stopping member 13 is positioned in the longitudinal direction with respect to the entire system in order to determine the number of groups of sheets desired to form a layer;

(h) rollers 6 are rotating in their feeding direction towards plane 5, while all other motors are stopped;

(i) all means (not shown) signalling the presence of the groups of sheets are inactive.

Operation of automatic working cycle B

It is assumed that plane 15 is raised; stopping member 34 is therefore in its pulled down position. The automatic phases pertaining to the formation of a layer, when it enters between the planes of the tipping group and when it is tipped, take place as already described in cycle A; the difference consists in the final transfer part of the layer of groups of sheets to the stacking machine, for which phase the small movable plane 36 is not used, the groups of sheets being of small size, and therefore requiring no support from the small movable plane; the fact that the latter is not necessary eliminates the necessity for the no layer tipping operation as well, which instead was necessary in cycle A, so that, after the successive operation of tipping "with a layer" the small movable plane was lowered and therefore in a position apt to support the layer of groups of sheets. Therefore, in cycle B tipping unit 2 may rotate in both directions always carrying a layer of groups of sheets. From the above it can be seen that cycle B takes place in a shorter amount of time with respect to cycle A, thus utilizing the potential of the corrugating unit more completely, which, also due to the size of the material (which is smaller in the case of cycle B with respect to the case of cycle A) turns out to be superior with respect to that in the case of cycle A.

It is obvious that the rotation without a layer would be unnecessary in the case of cycle A as well if small movable plane 36 was placed on plane 16 also, instead of on plane 15 only; this would however involve a greater construction complexity and, furthermore, the time which could be saved through eliminating the no layer rotation phase would not turn out to be useful since this no layer rotation takes place, as already stated, in the case of large sizes, but in this case the groups of sheets, due to the larger size of the corrugated board sheets leave the exit of the corrugating machine at a lower frequency with respect to the smaller size sheets.

It should be finally noted that in the case in which the preparatory unit comprising planes 4 and 5 feeds the stacking machine directly, and therefore, in other words, alternated or, at any rate, periodic tipping of the layers of groups of sheets is unnecessary and thus the tipping unit is omitted in the system, plane 5 may be provided with a small movable plane 39 carrying out a function analogous to the one described already for plane 36.

It is obvious that several variations and modifications may be applied by the experts in the art to the form of embodiment described hereinbefore by way of example, which is not to be intended in any limiting sense, without departing from the spirit thereof; it is intended that all such variations and modifications are within the field of the invention itself.

What is claimed is:

1. A machine for the formation and distribution of layers of groups of sheets, characterized in that it comprises a preparatory unit, formed by two horizontal planes placed at the same level, one after the other in longitudinal direction with respect to the machine and each of which comprises motor driven conveyor means, the motor driven means of the first one of said planes being able to be made to rotate in both directions in order to cause the groups of sheets to advance towards or move away from the second plane, said groups of sheets arriving on said first plane from a group of sheets production or formation machine, placed upstream, while the motor driven means of said second plane may be caused to rotate only in the direction which moves away from the first plane the groups of sheets which the second plane receives from the first, electric sensor control means being provided to start moving the motor driven means of the second plane only when a group of sheets is reaching it and to stop them when the group of sheets has passed completely over the second plane, said preparatory unit further comprising a stopping member, movable vertically over said second plane between a lowered position which stops the groups of sheets arriving on said second plane in order to be formed into a layer, and a raised position which allows feeding, downstream of said second plane, of the formed layer, said stopping member further being capable of sliding along fixed guides of the second plane and capable of being fastened at a distance from the separation area between the first and second planes, such to allow feeding to said second plane, of the desired number of groups of sheets for the layer to be formed, said control means further controlling the vertical movement of said stopping member as well as starting of the motor driven means of the first plane in the direction which moves the group of sheets away from the second plane as soon as the formation of the layer on said second plane has ended.

2. A machine according to claim 1, characterized in that when the last group of sheets which is to complete the layer has entered said second plane and therefore the first group of sheets has come into contact with said stopping member, control means cause the motor driven means of said first plane to stop while the motor driven means of said second plane continue to push the groups of sheets against the stopping member for a period of time controlled by a timer, in order to allow a correct side by side reciprocal positioning of the groups of sheets and therefore correct squaring and alignment of the layer.

3. A machine according to claim 2, characterized in that it further comprises a tipping unit, placed downstream with respect to said preparatory unit and formed by two opposed and parallel planes, each of which comprises motor driven conveyor means said two planes of the tipping unit being mounted in a main frame pivoted at its ends in order to allow rotation of 180° of said two planes and in such a position that one of said planes is at the same level with the planes of the preparatory unit, the planes of the tipping unit also being movable one with respect to the other in order to block a layer of groups of sheets between them, and control means being further provided to control, starting of rotation in both directions and stopping of the motor driven means of the planes of the tipping unit, stopping of the motor driven means of the second plane of the preparatory unit, stopping and starting of the feeding rotation of the motor driven means of the first plane of the preparatory unit, the reciprocal movement which brings together or moves away the two planes of the tipping unit plus rotation of the latter, the tipping unit being able to feed each layer of groups of sheets from the preparatory unit to a stacking machine, placed downstream with respect to the tipping unit.

4. A machine according to claim 3, characterized in that said tipping unit further comprises a stopping member for the layer of groups of sheets, such member being movable between a position which allows passage of the layer freely between the two planes of the tipping unit, and a position which holds the layer during the 180° rotation of the tipping unit itself.

5. A machine according to claim 4, characterized in that the planes of the tipping unit are also provided with strips of resilient material, movable between an inactive position in which they are not in contact with the layer of groups of sheets, and an active position in which, when said two planes of the tipping unit block a layer of groups of sheets between them, such blocking action is improved.

6. A machine according to claim 5, characterized in that the tipping unit is provided in at least one of its planes with a small supplementary plane placed at the same level with its related plane and capable of exiting from the latter during the phase feeding the layer of groups of sheets to the stacking machine placed downstream with respect to the system, in order to support layers of large size groups of sheets.

7. A machine according to claim 2, characterized in that the preparatory unit is provided in its second plane with a small supplementary plane placed at the same level with said plane and said plane during the phase of feeding the layer of groups of sheets to a stacking machine placed downstream with respect to the system, in order to support layers of large size groups of sheets.

* * * * *